United States Patent [19]

Stauch et al.

[11] Patent Number: 5,292,143
[45] Date of Patent: Mar. 8, 1994

[54] BICYCLE DROP-OUT AND METHOD OF ATTACHMENT

[75] Inventors: Dennis J. Stauch; William E. Shaffer, both of Kennewick, Wash.

[73] Assignee: Sandvik Special Metals Corporation, Kennewick, Wash.

[21] Appl. No.: 895,831

[22] Filed: Jun. 9, 1992

[51] Int. Cl.⁵ ............................................. B62K 25/02
[52] U.S. Cl. ................... 280/279; 280/281.1; 280/284; 280/288
[58] Field of Search ............ 280/274, 276, 279, 281.1, 280/284, 288; 29/DIG. 26, DIG. 48, 897.2; 228/164

[56] References Cited

U.S. PATENT DOCUMENTS

| | | | |
|---|---|---|---|
| 622,006 | 3/1899 | Jerome | 280/288 |
| 1,262,786 | 4/1918 | Harley | 280/288 |
| 2,996,600 | 8/1961 | Gardner, Jr. et al. | 228/164 X |
| 4,565,383 | 1/1986 | Isaac | 280/276 |
| 4,711,008 | 12/1987 | Nakamura | 29/DIG. 48 |
| 5,025,977 | 6/1991 | Hartman | 228/171 |
| 5,039,470 | 8/1991 | Bezin et al. | 280/279 X |
| 5,082,303 | 1/1992 | Duehring et al. | 280/288 |
| 5,096,215 | 3/1992 | Chonan | 280/281.1 X |

*Primary Examiner*—Sherman Basinger
*Attorney, Agent, or Firm*—Burns, Doane, Swecker & Mathis

[57] ABSTRACT

A dropout for a bicycle receiving tube includes an integral consumable ring which is melted upon the application of heat thereto to form a weld joint between the tube and the dropout. A one-piece dropout for a front axle includes a cylindrical mounting portion, a slotted front portion, and a tapered transition portion. The dropout can be cast or machined from a single piece of barstock such that the slotted front portion is offset radially inwardly relative to a largest outer diameter of the dropout. A three-piece dropout for receiving a rear axle includes two transition elements and a slotted plate welded to the transition elements.

26 Claims, 6 Drawing Sheets

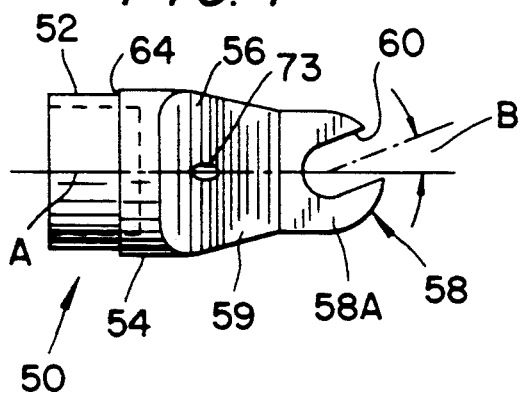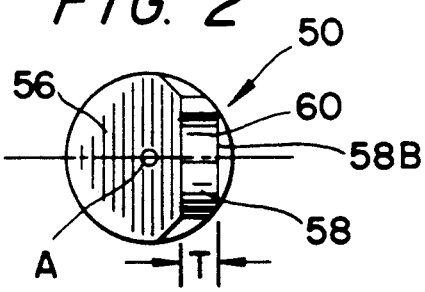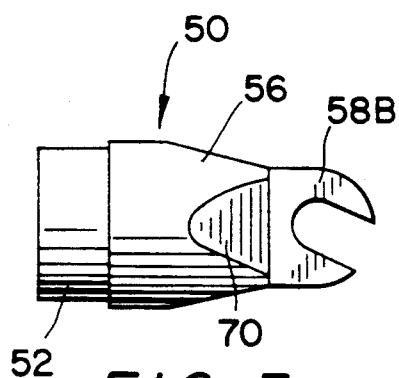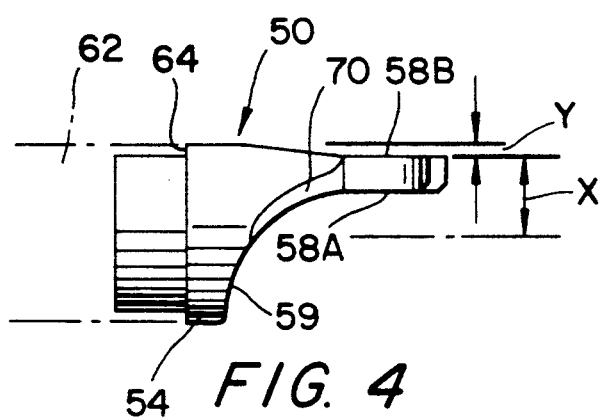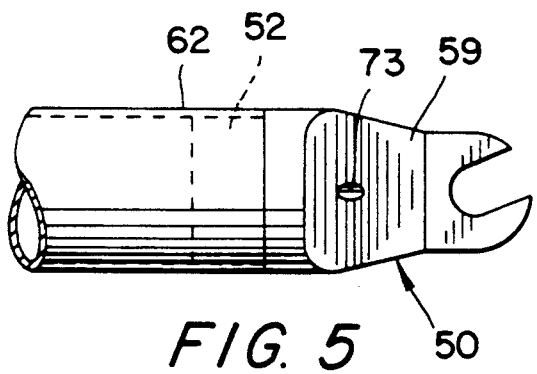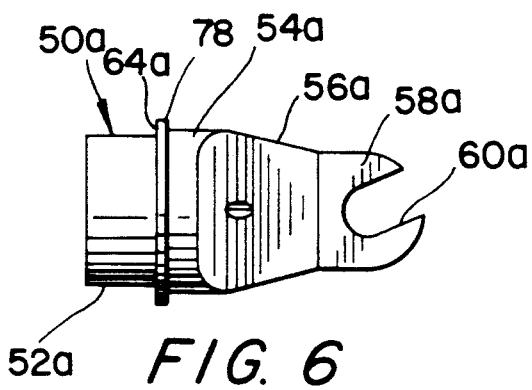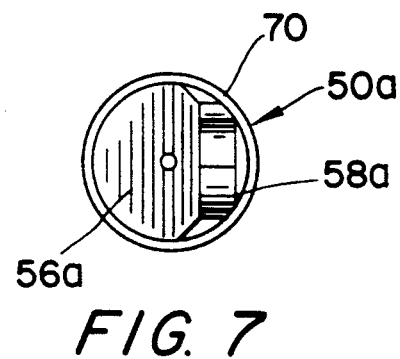

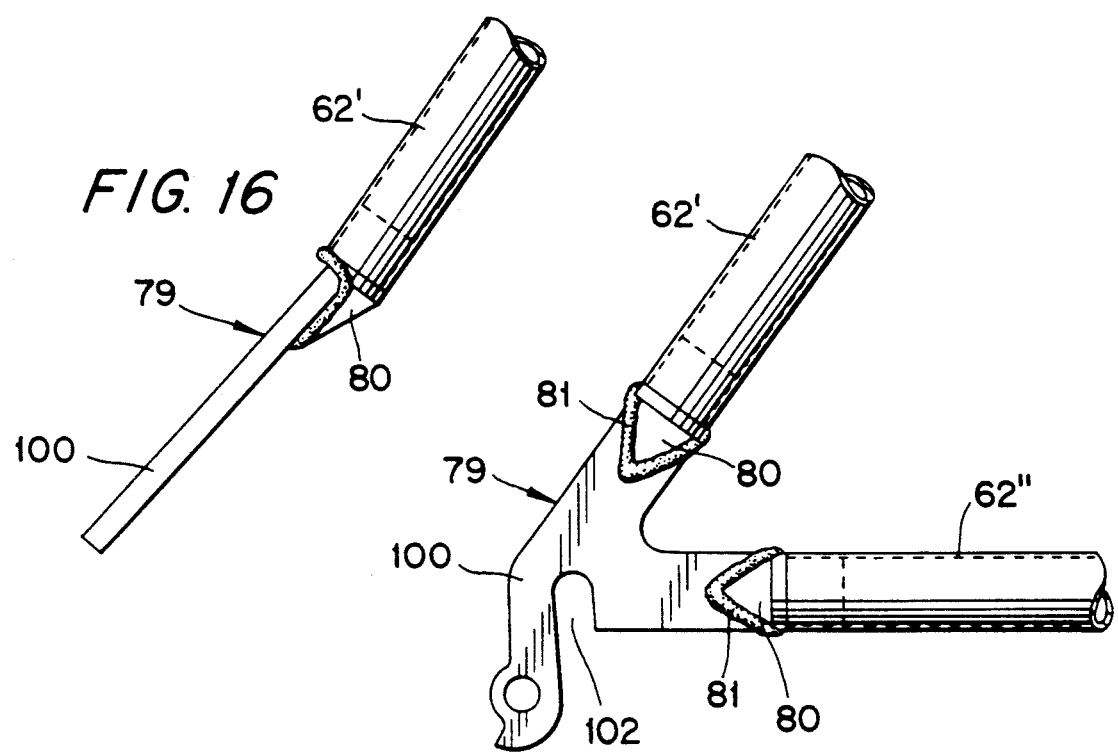
FIG. 16
FIG. 17
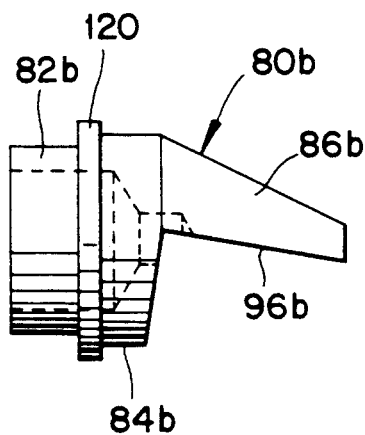
FIG. 18
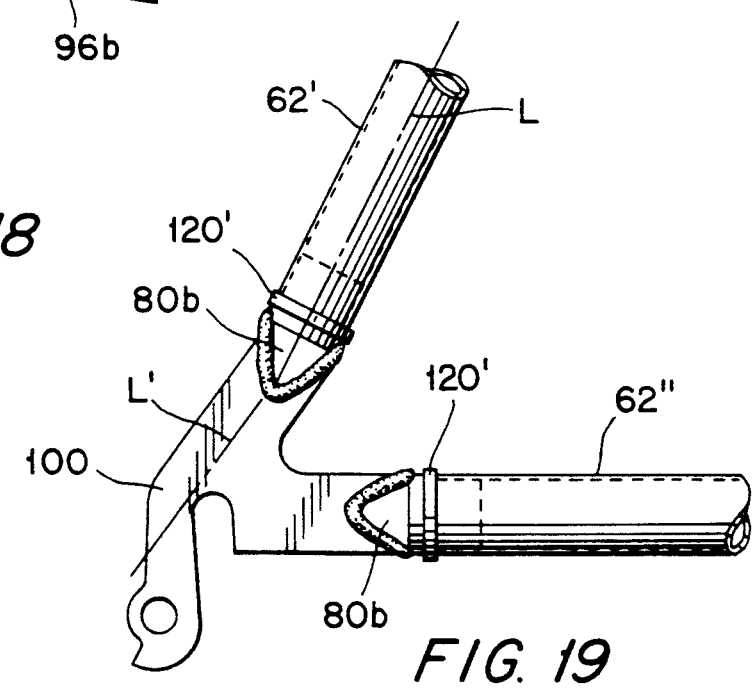
FIG. 19

BICYCLE DROP-OUT AND METHOD OF ATTACHMENT

BACKGROUND OF THE INVENTION

The present invention relates to drop-outs for attaching bicycle axles to bicycle frames and front forks.

The front and rear axles of a typical bicycle are attached to the front fork and frame, respectively, of the bicycle. In particular, the axles are retained in slotted elements called "drop-outs" which are welded to receiving tubes of the front fork and frame, respectively. Depicted in FIG. 22 is a rear axle drop-out 1, which includes a slot 2 for receiving a bicycle rear axle. The drop-out 1 also includes a pair of legs 3, 4 secured in receiving tubes 5, 6 of a bicycle frame. In FIG. 23 there is depicted a front axle drop-out 7 which includes a slot 8 for receiving a bicycle front axle, and a leg 9 securable in a receiving tube 10 of a front fork of the bicycle.

Various techniques have been proposed for incorporating dropouts in bicycle frames. For example, in a "slotted tube" technique, as depicted in FIG. 24, a flat front axle dropout 7 has been inserted into the center of the end of the receiving tube 10. That end of the receiving tube is then worked to form dome-like transitions 16 between the cylindrical shape of the receiving tube and the flat sides of the dropout 7.

A variation of the slotted tube technique commonly called the cover plate method, involves locating the drop-out leg to one side of the tube rather than being centered therein. A cover plate is positioned over the opening between the opposite side of the tube and the drop-out leg. The cover plate and drop-out leg are welded to the tube and to each other.

Yet another drop-out securing technique, called the plug method is depicted in FIG. 25. That technique involves inserting a plug 18 into the receiving tube 5 and then welding it to the tube such that the plug projects beyond the end of the tube. A slotted element 1 is then welded to the exposed end of the plug.

Another technique, depicted in FIGS. 20, 21 and 26, and described in commonly assigned U.S. Pat. No. 5,025,977 involves bending a rear end 20 of a flat strip and machining that bent rear end to form a generally cylindrical portion 22. That portion 22 is inserted to a beveled end 24 of the receiving tube 5 and is attached thereto by a weld 26, or alternatively by brazing or gluing. The dropout can be provided with shoulders 26 to limit the insertion of the cylindrical portion 22 into the tube 5. In FIG. 26 there are depicted two dropouts 20 mounted in the thin-walled receiving tubes 29 of a front fork 28 of a bicycle frame.

An axle (not shown) will be clamped between two opposing inner surfaces 30 of the dropouts 20. Therefore, it is desirable that the area of each surface 30 be of a certain minimum amount to enable a proper clamping to occur. Also, since the slotted part of the dropout is usually of a thin, plate-like shape, whereas the ends of the fork tubes are of cylindrical shape, it is necessary to provide a transition between each tube and its dropout for atheistic reasons and also to avoid the presence of sharp corners which could risk injury to a rider or his clothes. It will be appreciated that the above criteria can be fulfilled by the earlier described dropout-forming techniques. However, each of those techniques involves either an appreciable amount of custom shaping of the tubes or an appreciable amount of fit-up and welding time. For example, the FIG. 24 technique requires that the tubes be specially shaped to form the dome-like transitions 16. The FIG. 23 technique eliminates a custom shaping of the tubes, but requires that two welding operations be performed to form a dropout.

The FIG. 20-21 technique requires a custom shaping of the tube, an that bending and machining operations be performed in order to make the dropout.

Similar considerations exist with respect to rear dropouts. Moreover, in the case of a one-piece rear axle dropout, it is necessary to provide that dropout with two mounting portions which attach to the seat stay tube and chain stay tube, respectively, of the frame. It is thus necessary that the angular relationship between the two mounting portions of the dropout correspond to the angular relationship between the seat stay tube and chain stay tube to which those mounting portions are to be attached. That means that for different bicycle sizes (having different angularly related seat and chain stay tubes), dropouts of corresponding sizes must be provided. That requirement significantly increases the overall manufacturing costs and difficulty.

It would be desirable to provide novel front and rear axle dropouts and methods of making same which alleviates the above shortcomings.

Another aspect of dropout-installation relates to the manner of adhering the dropout in its receiving tube. In some cases the dropout is adhered by an adhesive, whereas in other cases the dropout is adhered by a weld. When welding is performed, it is necessary to manipulate a filler wire, which contributes to the overall complexity of the manufacturing process. Also, the application of too much heat during the welding process can damage the thin-walled receiving tubes.

Therefore, it would be desirable to enable dropouts to be more easily welded to thin-walled tubes, especially titanium tubes, without damaging the tubes.

SUMMARY OF THE INVENTION

One aspect of the present invention involves a one-piece metal dropout adapted to be attached to a hollow metal receiving tube of a bicycle for retaining a front axle. That dropout comprises a rear section including a cylindrical mounting portion sized to be inserted into the receiving tube, and a front section including an axle-receiving portion having an axle-receiving slot. A thickness of the axle-receiving portion is less than an outer diameter of the mounting portion. A transition portion is disposed between the rear section and the axle-receiving portion and tapers toward the axle-receiving portion. The axle-receiving portion is offset radially outwardly relative to a longitudinal axis of the mounting portion and is offset radially inwardly relative to the largest outer diameter of the dropout.

Another aspect of the invention involves a metal dropout adapted to be attached to seat stay and chain stay tubes of a bicycle for retaining a rear axle. The dropout comprises two transition elements, and a slotted plate attached thereto. Each of the transition elements includes a rear section formed as a cylindrical mounting portion which is sized to be inserted into a respective one of the tubes, and a front section having a curved wall shaped as a segment of a cone whose longitudinal axis corresponds to a longitudinal axis of the rear section, and a front-to-rear extending contact surface extending between opposite edges of the curved wall. The slotted plate is attached to the transition elements and engages the contact surfaces thereof.

Another aspect of the present invention involves a transition element adapted for attachment to a tube of a bicycle and to a slotted plate which receives a rear axle. The transition element comprises a rear section formed as a cylindrical mounting portion sized to be inserted within the tube, and a front section having a curved wall shaped as a segment of a cone whose longitudinal axis corresponds to that of the mounting portion. A front-to-rear extending, substantially flat contact surface extends between opposing edges of the curved wall.

Another aspect of the invention involves a metal dropout adapted to be attached to a hollow metal receiving tube of a bicycle for retaining an axle. The dropout comprises a cylindrical mounting portion sized to be received in the tube, a slot for receiving an axle, and a radially outwardly projecting consumable ring arranged to lie adjacent an end of the tube when the mounting portion is inserted therein. The consumable ring is meltable upon the application of heat thereto to form a weld joint between the dropout and the tube.

A further aspect of the present invention involves a method of attaching a dropout to a receiving tube of a bicycle, wherein a cylindrical mounting portion is inserted into a cylindrical end of the tube and is welded in place. The method comprises providing the dropout with a radially outwardly projecting consumable ring of one-piece construction with the mounting portion and spaced forwardly from a rear end of the mounting portion. The mounting portion is inserted into the tube such that the consumable ring is disposed immediately adjacent an end of the tube. Heat is applied to cause the consumable ring to melt and form a weld joint between the dropout and the tube.

Yet another aspect of the invention involves a method of making a one-piece dropout for receiving a front axle of a bicycle. The method comprises the steps of providing a cylindrical metal barstock having a cylindrical outer periphery. A midsection of the barstock is machined to taper the midsection toward a front section of the barstock. The front section is machined into the shape of a flat plate having an axial-receiving slot, whereby the flat plate is spaced radially outwardly from a longitudinal axis of the barstock and radially inwardly from the cylindrical outer periphery of the barstock. One side of the tapered midsection is machined to form a surface extending from a rear surface of the barstock to the plate.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 1 is a side elevational view of a one-piece metal dropout for receiving a front axle of a bicycle according to the present invention;

FIG. 2 is a front end view of the dropout depicted in FIG. 1;

FIG. 3 is a side elevational view of the dropout from the opposite side shown in FIG. 1;

FIG. 4 is a top plan view of the dropout;

FIG. 5 is a view similar to FIG. 1 depicting the dropout after being mounted in a receiving tube;

FIG. 6 is a view similar to FIG. 1 of a second preferred embodiment of the dropout;

FIG. 7 is a view similar to FIG. 2 of the second embodiment;

FIG. 16 is an end view of a rear axle dropout mounted to a bicycle frame, the dropout including a transition element according to FIG. 12;

FIG. 17 is a side view of FIG. 16;

FIG. 18 is a view similar to FIG. 12 of a second embodiment of a transition element;

FIG. 19 is a view similar to FIG. 17 in which the second transition element embodiment has been employed;

DETAILED DESCRIPTION OF A PREFERRED EMBODIMENT OF THE INVENTION

Figure 8:
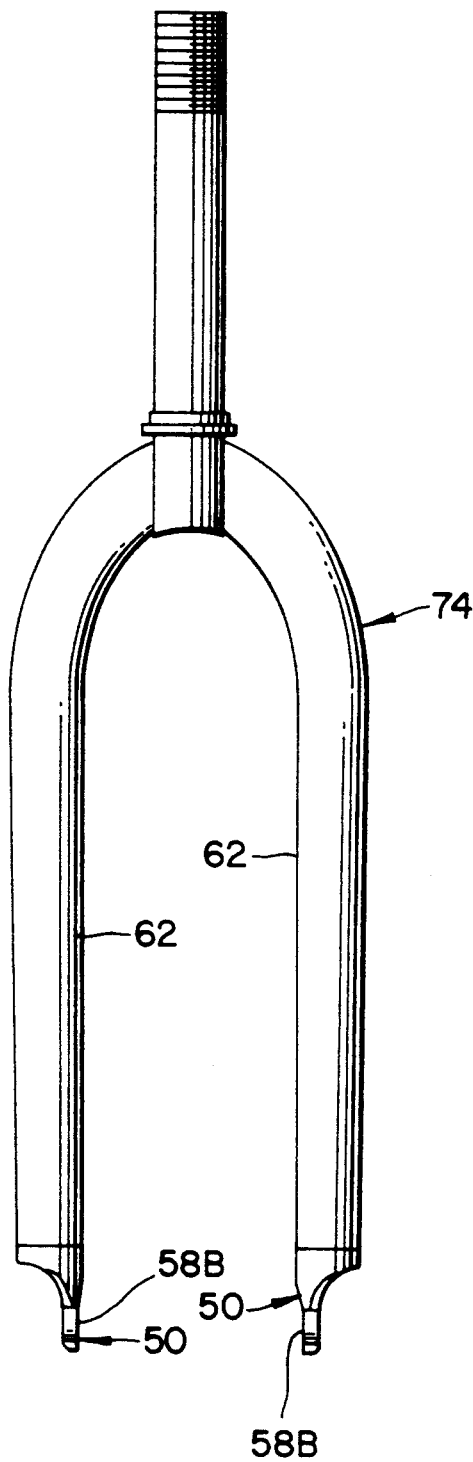
FIG. 8 is a front view of a bicycle fork in which two dropouts of FIG. 1 have been mounted.

In accordance with the present invention, a front-axle drop-out 50 comprises a rear section including mounting portion 52, and an intermediate portion 54 (see FIGS. 1–5). A transition portion 56 extends between the intermediate portion and a front section, the latter including an axle-retaining portion 58 in which a slot 60 is formed.

The mounting portion 52 is of cylindrical configuration and has a diameter sized to be slidable into an open end of a receiving tube 62, preferably a thin-walled titanium tube. The intermediate portion 54 is also of cylindrical shape and has a diameter which corresponds to the outer diameter of the receiving tube 62 and which is slightly larger than the diameter of the mounting portion so as to form a rearwardly facing radial shoulder 64 therewith.

The transition portion 56 is of a forwardly tapering configuration. The axle-retaining portion 58 is flat and situated at the front end of the transition portion 56. The axle-retaining portion 58 includes flat outer and inner surfaces 58A, 58B. The inner surfaces 58B contact portions of the front axle to clamp that axle, and the outer surfaces 58A are engaged by a fastener such as a nut to press the inner surface against the axle. The inner surface 58B is laterally outwardly offset by a distance X relative to the longitudinal center axis A of the drop-out member, and laterally inwardly offset by a distance Y relative to the outer periphery of the intermediate portion. The transition portion 56 includes a radiused surface 59 which extends from the intermediate portion 54 to the outer surface 58A. The axle-retaining portion has a thickness T less than the diameter of the mounting portion 52.

The slot 60 of the axle-retaining portion 58 extends at an angle B, e.g., about 25 degrees relative to the axis A.

The drop-out member can be formed of any suitable material, such as titanium as is conventional in the art. The dropout member can be manufactured by various techniques, including machining and casting (e.g., by the lost wax investing casting technique).

Figure 9A:
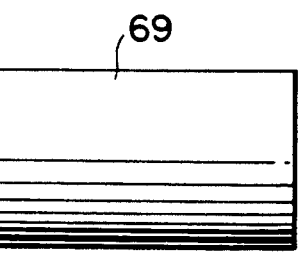
FIGS. 9A–9D show successive steps during the fabrication of the FIG. 1 dropout from a piece of barstock.
Figure 9B:
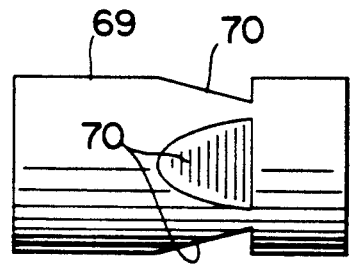
Figure 9C:
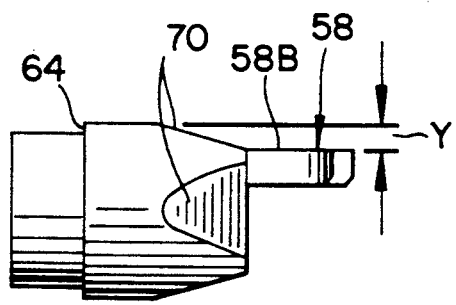
Figure 9D:
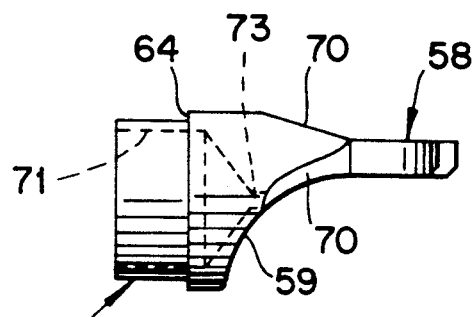

In a machining operation, the dropout member 50 would be manufactured from a solid piece of titanium bar stock 69 depicted in FIG. 9A. Initially, a mid-section of the bar stock is machined to form four circumferentially spaced bevels 70 (see FIG. 9B), whereby the is of generally conical shape. Thereafter, the front section of the bar stock is machined to form the flat axle-retaining portion 58 (see FIG. 9C). A side of the midsection is then removed by machining the radiused surface 59 therein (see FIG. 9D). At some point during the manufacturing phase the rear section of the barstock is machined to form the shoulder 64, and the rear section is hollowed out at 71 to form a rearwardly open recess. The hollowing narrows toward the radiused surface 59, and terminates in the form of an axial hole 73 extending through the surface 59. The hollowing of the dropout, as well as the tapering of the transition portion, serves to reduce the weight of the dropout. The axial hole 73 serves as a purge gas escape hole or as an emplosion exit hole.

By machining the front portion of the barstock such that the inner surface 58B is offset by distance Y from the outer periphery of the barstock, the area of that surface 58B can be made sufficiently large. That is, with reference to FIG. 2, it will be appreciated that the closer that the surface 58B is located to the center axis A, the larger will be its area. In this fashion, the dropout 50 can be formed of one piece from a piece of barstock while ensuring that the surface 58 is sufficiently large.

There is thus provided a simple machining method for forming a dropout member having a flat axle-receiving portion 58, a tapered transition portion 56, and a cylindrical rear mounting portion 52 which does not require any custom shaping or fitting of the end of the receiving tube 62 either before or after the installation of the dropout member.

Two drop-out members 50 are installed in a fork 74 by inserting the mounting portions 52 into the receiving tubes 62 until the shoulders 64 abut the ends of the tubes, and thus bonding the mounting portions within the tube by welding, brazing or gluing (see FIGS. 5 and 8).

It will be appreciated that the tapered transition portion 56 creates a smooth transition between the front and rear sections. This is achieved without having to pre-shape the end of the receiving tube. Also, no gaps remain which must be filled with weld metal or other fixtures and which would reduce the strength of the joint.

The cylindrical mounting portion 52 simplifies the mating of the dropout member and receiving tube and provides a maximum surface area for bonding the dropout to the receiving tube. Hence, it is possible to eliminate a welding step and the resulting input of heat into the thin-walled receiving tube.

However, if it is desired to affix the dropout member by welding, then the dropout member is integrally formed with an annular, radially outwardly projecting flange 78 as depicted in FIG. 6. The rest of the dropout member is identical to that described in connection with FIGS. 1–5, and the corresponding parts thereof are designated by the same reference numerals followed by the suffix a.

Figure 10:
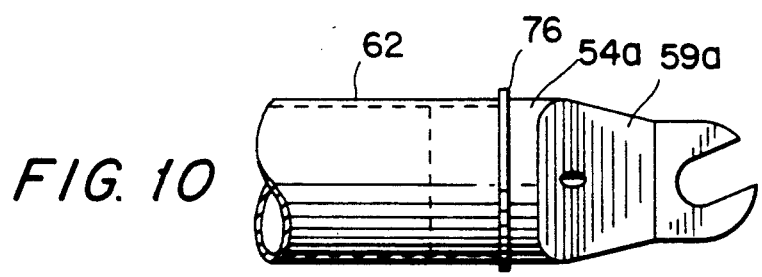
FIG. 10 is a side elevational view of the FIG. 6 dropout upon being inserted into a metal receiving tube.
Figure 11:
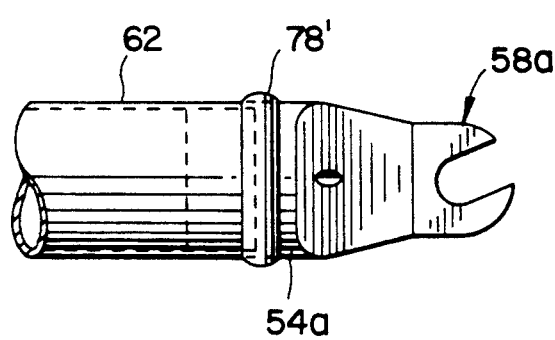
FIG. 11 is a view similar to FIG. 10 after a consumable ring portion of the dropout has been melted to form a weld joint between the tube and the dropout.

The flange 78 is located at the shoulder 64a, so as to be situated at the interface between the receiving tube 62 and the intermediate portion 54a when the dropout member 50a has been inserted, as depicted in FIG. 10. As shown in FIG. 11, the flange 78 serves as a consumable ring during the welding step to eliminate the need for a filler wire. Following the welding step in which the consumable ring is melted, the melted consumable ring hardens and defines a weld joint 78' which overlaps the receiving tube and the intermediate portion 54a to secure the dropout member 50a to the receiving tube 62. Note that the outer diameter of the intermediate portion 54a corresponds to that of the receiving tube.

The dropout 50a containing the consumable ring can be made by the same method disclosed in connection with FIGS. 9A–9D, except that a barstock of larger diameter would be used and would be machined to reduce its outer diameter along the intermediate portion 54, thereby forming the consumable ring. Thus, the outer circumferential surface of the consumable ring would be formed by the original outer circumferential surface of the barstock.

The circular welding path defined by the consumable ring makes the dropout member 50a well suited to a single-plane automatic welding machine and provides a highly uniform weld joint. Also, the amount of heat introduced into the thin-walled receiving tube is minimized, thereby reducing the possibility of the tube being damaged.

Figure 12:
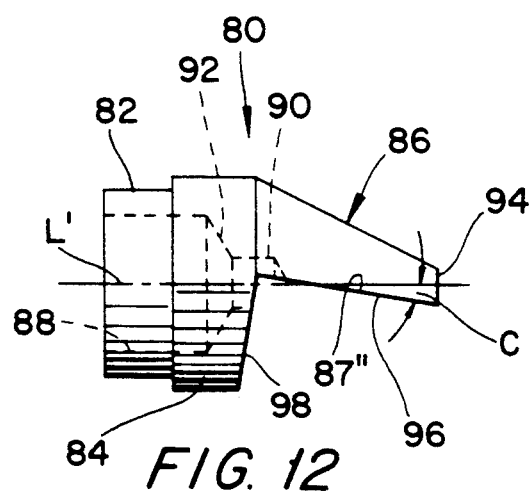
FIG. 12 is a top plan view of a transition element used in connection With a rear dropout.
Figure 13:
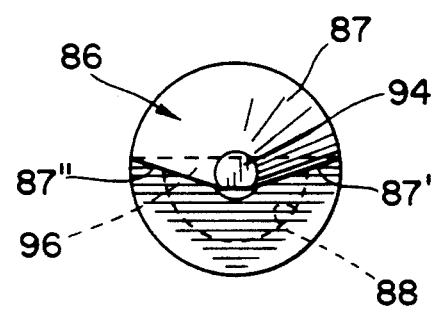
FIG. 13 is a front end view of the dropout of FIG. 12.
Figure 14:
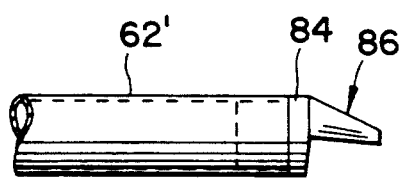
FIG. 14 is a top view of the FIG. 12 dropout after being inserted into a receiving tube.
Figure 15:
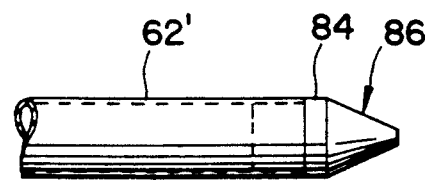
FIG. 15 is a side elevational view of FIG. 14.
Figure 20:
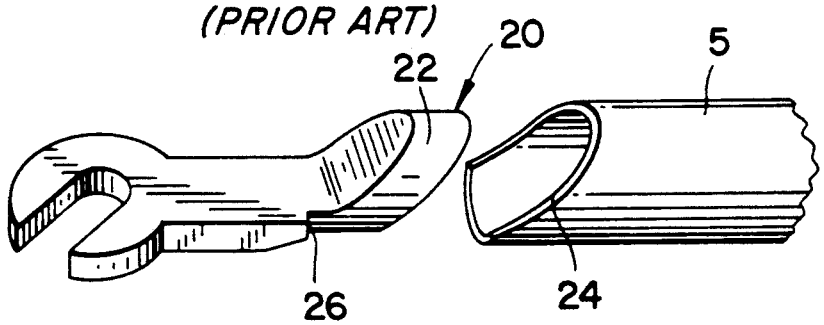
FIG. 20 is an exploded perspective view of a prior art front axle dropout about to be inserted into a receiving tube.
Figure 21:
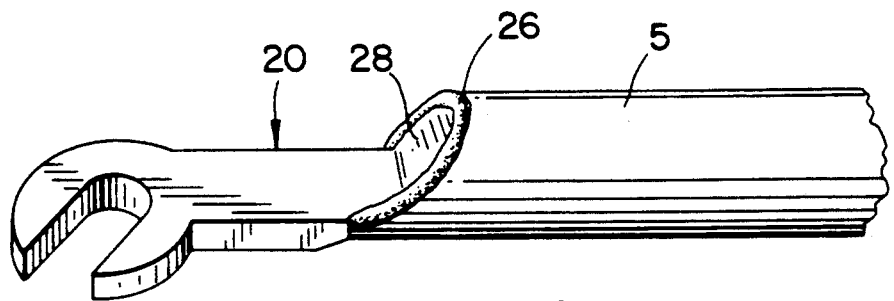
FIG. 21 is a view similar to FIG. 20 after the dropout has been attached to the receiving tube.
Figure 22:
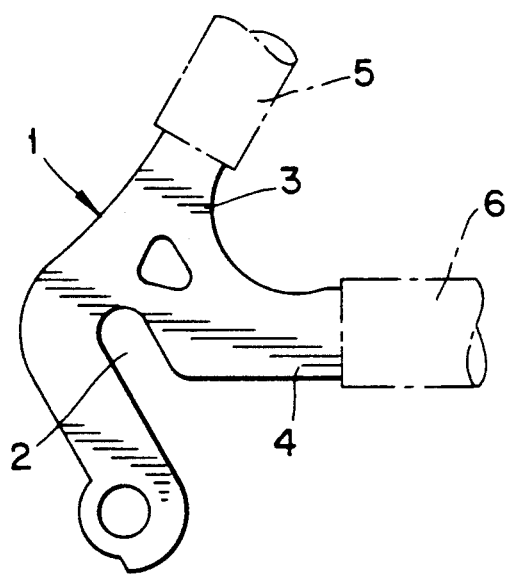
FIG. 22 is a side view of a prior art rear axle dropout.
Figure 23:
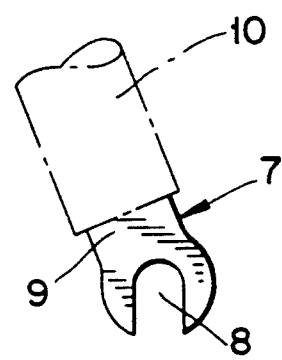
FIG. 23 is a side view of another prior art front axle dropout.
Figure 24:
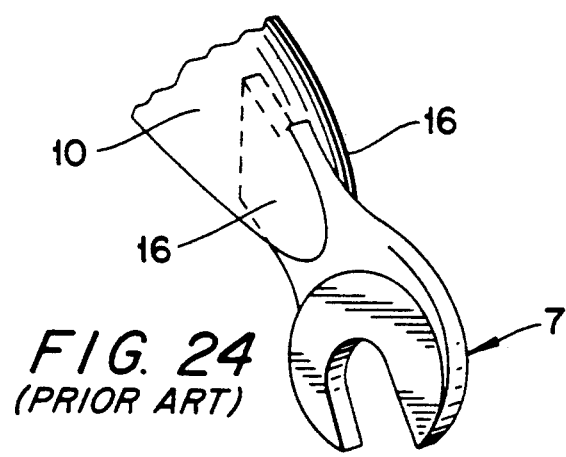
FIG. 24 is a perspective view of yet another prior art front axle dropout.
Figure 25:
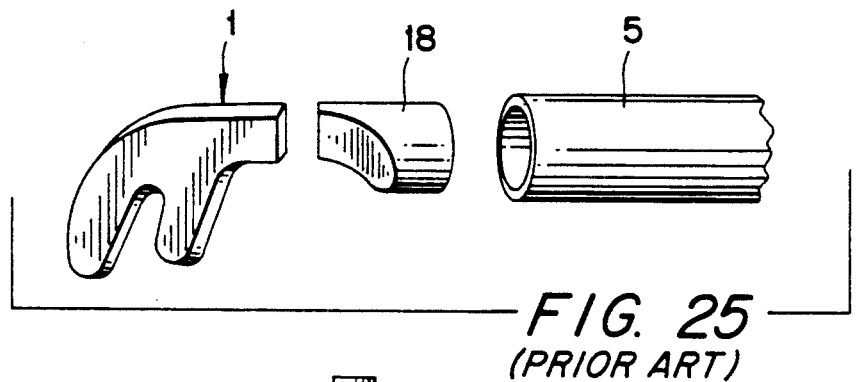
FIG. 25 is an exploded perspective view of yet another prior art front axle dropout.
Figure 26:
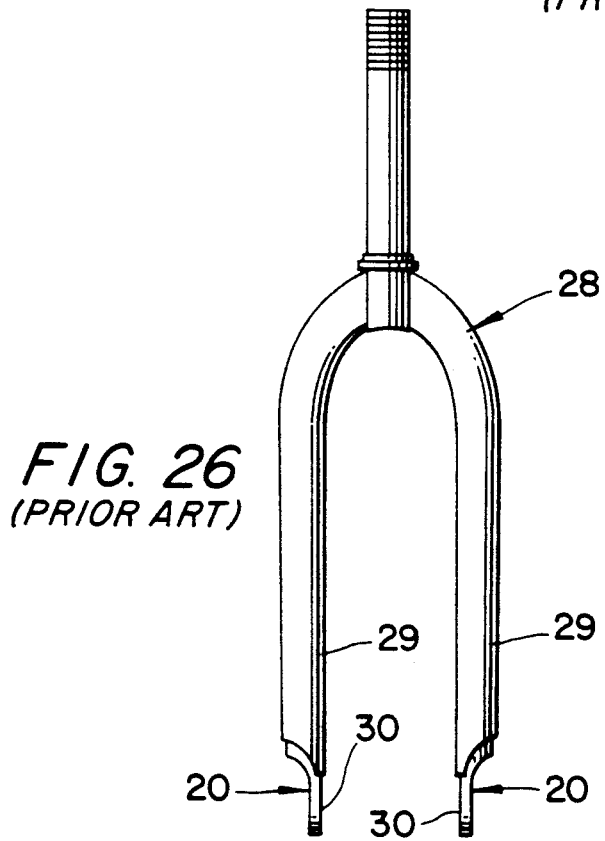
FIG. 26 is a front view of a bicycle fork containing two dropouts according to FIG. 21.

Depicted in FIGS. 16–17 is a rear axle dropout 79 which comprises a plate 100 and two transition elements 80 welded thereto. Each transition element 80 comprises a cylindrical mounting portion 82, a cylindrical intermediate portion 84, and a tapered transition portion 86 (see FIGS. 12–13). A recess is disposed through the mounting and intermediate portions 82, 84. The recess includes a large diameter rear section 88, a small diameter front section 90, a frusto-conical interconnection section 92 interconnecting the sections 88, 90.

The transition elements 80 are machined from solid pieces of cylindrical barstock. Thus, the tapered section 86 is in the form of a segment of a solid cone which has been truncated along a radial plane at its front end 94 and along a generally longitudinal plane oriented at a slight angle C (e.g., 7°) relative to a longitudinal axis L' of the transition piece. The longitudinal truncation forms a front-to-rear extending contact surface 96 which is intersected by the longitudinal axis L' at a location intermediate the front and rear ends of the surface 96. That contact surface extends between opposite edges 87', 87'' of a curved outer wall 87 of the tapered section 86.

An exposed front edge 98 of the intermediate section 84 is oriented at a ninety degree angle relative to the contact surface 96.

In practice, the dropout 80 is installed by inserting the mounting portions 82 of the two transition pieces 80 into a seat stay tube 62' and a chain stay tube 62", respectively of the bicycle frame, and bonding those mounting portions in place such as by welding, brazing or gluing. The legs of the rear axle plate 100 are then placed against the flat contact surfaces 96 of the transition elements 80, and attached to the tapered portion 86 of the dropouts 80 such as by welds 81 using filler wire. The plate 100 contains a rear axle-receiving slot 102 for receiving a rear axle.

The transition element 80 of the rear axle dropout provides advantages similar to those provided by the front axle dropout 50. That is, the tapered section 86 creates a smooth transition and minimizes the presence of gaps which require filling. The transition element 80 can be easily machined and requires no bending and mitering. Also, there is no need for custom shaping or fitting of the ends of the receiving tubes 62', 62" in order to receive the transition elements 80. Moreover, the same transition elements 80 and slotted plate 100 can be used for bicycle frames of different sizes wherein the tubes 62'62" form different angles therebetween, because the transition element can be angularly offset relative to the legs of the rear axle plate. Such a relationship is depicted in FIG. 19 wherein the longitudinal axis L of one of the transition elements 80b and its associated receiving tube 62' is angularly related to the longitudinal axis L' of the associated leg of the rear axle plate 100.

If it is desired to secure the transition elements to the tubes by welding, the elements 80b are machined so as to be formed with an integral, one-piece radial flange 120 as depicted in FIG. 18. The parts of the element 80b which correspond to the earlier described element 80b are designated by identical numerals having a suffix b. Like the earlier described flange 78, the flange 120 is melted by heat and serves as a consumable ring which eliminates the need for filler wire during the welding step. After the welding step, the melted flanges 120 harden to form weld joints 120' as depicted in FIG. 19.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A one-piece metal dropout adapted to be attached to a hollow metal receiving tube of a bicycle for retaining a front axle, comprising:
   a rear section including a cylindrical mounting portion sized to be inserted into the receiving tube, said cylindrical mounting portion being hollow to form a rearwardly open recess, a radially outwardly projecting shoulder disposed at a front end of said mounting portion for limiting the depth of insertion of said dropout into the receiving tube,
   a front section including an axle-receiving portion having an axle-receiving slot, a thickness of said axle-receiving portion being less than an outer diameter of said mounting portion, and
   a transition portion disposed between said rear section and said axle-receiving portion and tapering toward said axle-receiving portion, a hole extending through said transition portion and opening into said recess in said mounting portion, said hole being of smaller cross section than said recess,
   said axle-receiving portion being offset radially outwardly relative to a longitudinal axis of said mounting portion and offset radially inwardly relative to the largest outer diameter of said dropout.

2. A metal dropout according to claim 1, wherein said rear section includes a rearwardly and radially outwardly projecting shoulder disposed at a front end of said mounting portion for limiting the depth of insertion of said dropout into the receiving tube.

3. A metal dropout according to claim 1, wherein said rear section includes a cylindrical intermediate portion disposed between said mounting portion and said transition portion.

4. A metal dropout according to claim 3 including a radially outwardly projecting consumable ring disposed adjacent a front end of said mounting portion, said consumable ring having a larger diameter than said mounting portion and said intermediate portion and being consumable during a welding operation to form a weld joint between the dropout and the receiving tube.

5. A metal dropout according to claim 1, wherein said axle-receiving portion is generally flat.

6. A metal dropout according to claim 1, wherein said cylindrical mounting portion is of circular cross sectional shape.

7. A one-piece metal dropout adapted to be attached to a hollow metal receiving tube of a bicycle for retaining a front axle, comprising:
   a rear section including a cylindrical mounting portion sized to be inserted into the receiving tube, and an intermediate portion disposed forwardly of said mounting portion,
   a front section including an axle receiving portion having an axle-receiving slot,
   a transition portion disposed between said intermediate portion and said axle receiving portion and being tapered toward said axle-receiving portion, and
   a consumable ring disposed between said mounting portion and said intermediate portion, said consumable ring having a larger diameter than said mounting portion and said intermediate portion and being consumable during a welding operation to form a weld joint between said intermediate portion and a receiving tube.

8. A metal dropout according to claim 7 wherein said rear section includes a radially outwardly projecting shoulder disposed at a front end of said mounting portion for limiting the depth of insertion of said dropout into the receiving tube.

9. A metal dropout according to claim 7, wherein said axle-receiving portion is generally flat.

10. A metal dropout according to claim 7, wherein said rear section is hollow.

11. A metal dropout according to claim 10 including a hole extending through said transition portion along a longitudinal axis of said mounting portion.

12. A metal dropout adapted to be attached to seat stay and chain stay tubes of a bicycle for retaining a rear axle, comprising:
   two transition elements, each including:
      a rear section formed as a cylindrical mounting portion sized to be inserted into
      a respective one of said tubes, and
      a front section having a curved wall shaped as a segment of a cone whose longitudinal axis corresponds to a longitudinal axis of said rear section, and a front-to-rear extending contact surface extending between opposing edges of said curved wall, and a slotted plate attached to said transition elements and engaging said contact surfaces thereof.

13. A metal dropout according to claim 12, wherein said contact surface is inclined relative to a longitudinal axis defined by said mounting portion, said axis intersecting said contact surface intermediate front and rear ends thereof of said contact surface.

14. A metal dropout according to claim 12 including a rearwardly facing radial shoulder formed in said rear section.

15. A metal dropout according to claim 12 including a radially outwardly projecting consumable ring disposed adjacent a front end of said mounting portion, said consumable ring having a larger diameter than said mounting portion and being consumable during a welding operation to form a weld joint between the dropout and the receiving tube.

16. A metal dropout according to claim 13, wherein said slotted plate is welded to said transition elements, said slotted plate including a substantially flat surface engaging said contact surfaces, said contact surfaces being substantially flat.

17. A one-piece transition element adapted for attachment to a tube of a bicycle and to a slotted plate which receives a rear axle, comprising:

a rear section formed as a cylindrical mounting portion sized to be inserted within said tube, and a front section having a curved wall shaped as a segment of a cone whose longitudinal axis corresponds to that of said mounting portion, and a front-to-rear extending, substantially flat contact surface extending between opposing edges of said curved wall.

18. A transition element according to claim 17, wherein said contact surface is inclined relative to a longitudinal axis defined by said mounting portion, said axis intersecting said contact surface intermediate front and rear ends thereof of said contact surface.

19. A transition element according to claim 17 including a rearwardly facing radial shoulder formed in said rear section.

20. A metal dropout according to claim 17 including a radially outwardly projecting consumable ring disposed adjacent a front end of said mounting portion, said consumable ring having a larger diameter than said mounting portion and being consumable during a welding operation to form a weld joint between the transition element and the tube.

21. A method of making a one-piece dropout for receiving a front axle of a bicycle, comprising the steps of:

A. providing a cylindrical metal barstock having a cylindrical outer periphery,

B. machining a midsection of said cylindrical metal barstock to taper said midsection toward a front section of said barstock, C. machining a rear section of said barstock to form a rearwardly facing radial shoulder therein, C. machining said front section into the shape of a flat plate having an axle-retaining slot, whereby said flat plate is spaced radially outwardly from a longitudinal axis of said barstock and radially inwardly from said cylindrical outer periphery and E. machining one side of said tapered midsection to form a surface extending from a rear section of said barstock to said plate, whereby a final orientation of said plate with respect to said longitudinal axis is established by steps D and E.

22. A method according to claim 21 including machining a rear section of said barstock to form a radially outwardly projecting consumable ring therein.

23. A method according to claim 21, wherein step D is performed subsequent to step B; step E is performed subsequent to step D.

24. A front steering fork for a bicycle comprising:

a pair of receiving tubes having hollow lower ends, and one-piece metal dropouts welded to respective ones of said lower ends, each of said dropouts having a slot for receiving a front axle, each dropout further including:

a rear section including a cylindrical mounting portion seated within the respective receiving tube, said mounting portion being hollow to form a rearwardly open recess, a radially outwardly projecting shoulder disposed at a front end of said mounting portion limiting the depth of insertion of said dropout in the respective receiving tube, said shoulder being welded to said respective receiving tube, a front section including an axle-receiving portion having an axle-receiving slot, a thickness of said axle-receiving portion being less than an outer diameter of said mounting portion, and a transition portion disposed between said rear section and said axle-receiving portion and tapering toward said axle-receiving portion, a hole extending through said transition portion and opening into said recess in said mounting portion, said hole being of smaller cross-section than said recess, said axle-receiving portion being offset radially outwardly relative to a longitudinal axis of said mounting portion and offset radially inwardly relative to the largest outer diameter of said dropout.

25. A one-piece metal dropout adapted to be attached to a hollow metal receiving tube of a bicycle for retaining a front axle, comprising:

a rear section including a cylindrical mounting portion sized to be inserted into the receiving tube, a front section including an axle-receiving portion having an axle-receiving slot, a thickness of said axle-receiving portion being less than an outer diameter of said mounting portion, and a transition portion disposed between said rear section and said axle-receiving portion and tapering toward said axle-receiving portion, said rear section including a cylindrical intermediate portion disposed between said mounting portion and said transition portion, said axle-receiving portion being offset radially outwardly relative to a longitudinal axis of said mounting portion and offset radially inwardly relative to the largest outer diameter of said dropout, a radially outwardly projecting consumable ring disposed adjacent a front end of said mounting portion, said consumable ring having a larger diameter than said mounting portion and said intermediate portion and being consumable during a welding operation to form a weld joint between the dropout and the receiving tube.

26. A method of making a one-piece dropout for receiving a front axle of a bicycle, comprising the steps of:

provided a cylindrical metal barstock having a cylindrical outer periphery, machining a midsection of said cylindrical metal barstock to taper said midsection toward a front section of said barstock, machining said front section into the shape of a flat plate having an axle-retaining slot, whereby said flat plate is spaced radially outwardly from a longitudinal axis of said barstock and radially inwardly from said cylindrical outer periphery, machining one side of said tapered midsection to form a surface extending from a rear section of said barstock to said plate, and machining a rear section of said barstock to form a radially outwardly projecting consumable ring therein.

* * * * *